Nov. 22, 1949  C. L. EKSERGIAN  2,488,768
RAILWAY TRUCK
Filed July 16, 1946  2 Sheets-Sheet 1

INVENTOR
Carolus L. Eksergian.

BY Honald B Waite
ATTORNEY

Nov. 22, 1949  C. L. EKSERGIAN  2,488,768
RAILWAY TRUCK
Filed July 16, 1946  2 Sheets-Sheet 2

INVENTOR
Carolus L. Eksergian
BY
ATTORNEY

Patented Nov. 22, 1949

2,488,768

UNITED STATES PATENT OFFICE 2,488,768

RAILWAY TRUCK

Carolus L. Eksergian, Detroit, Mich., assignor to The Budd Company, Philadelphia, Pa., a corporation of Pennsylvania Application July 16, 1946, Serial No. 683,907

5 Claims. (Cl. 105—190)

The invention relates to railway rolling stock and more particularly to truck construction.

Recent developments in the design of high-speed light-weight trains have utilized truck bolster springs of upright steel coils of relatively low deflection rate to provide more flexibility than had been common heretofore. Such bolster springs are likely to oscillate vertically and to yield to lateral roll so freely as to detract from the otherwise easy riding qualities of such more flexible springs.

One of the objects of the present invention is to provide a high level transverse restraint to the forces causing lateral deflection of, and unequal vertical deflection of, the free acting bolster springs, this restraint being applied along a transverse line of application at a level above the center plate of the bolster and aproaching the level of the center of gravity of a car body mounted on the truck center plate.

In a common type of truck structure the bolster is mounted for lateral movement on the truck frame through its carriage by swing hangers pivoted to the truck frame and mounting the bolster springs. This mounting of the bolster springs is ordinarily through a spring plank directly carried by the swing hangers. According to the invention, the truck center plate portion of the bolster is arranged at a low level to secure a low center of gravity for the car body mounted thereon, and the ends of the bolster are extended upwardly preferably above the truck frame to provide high side bearings for the car body. The bolster is spring supported at its ends from the spring plank or other suitable means, as by long relatively low rate coil springs. To provide for the restraint to lateral movement and roll of the bolster with respect to the support from which it is sprung, lateral restraining means, such as a high level transverse substantially horizontal link connection is provided between the bolster and the support, in the embodiment shown, the spring plank, this connection being well above the level of the truck center bearing and therefore, approaching in level the level of the center of gravity of the car body supported thereby.

This connection imposes a restraint upon the lateral rolling tendency which would normally be present due to the free-acting springs and also prevents undue lateral distortion of said springs.

These and other objects and advantages and the manner in which they are attained will become apparent from the following detailed description forming a part of this specification when read in connection with the accompanying drawings.

Figures 1, 2:
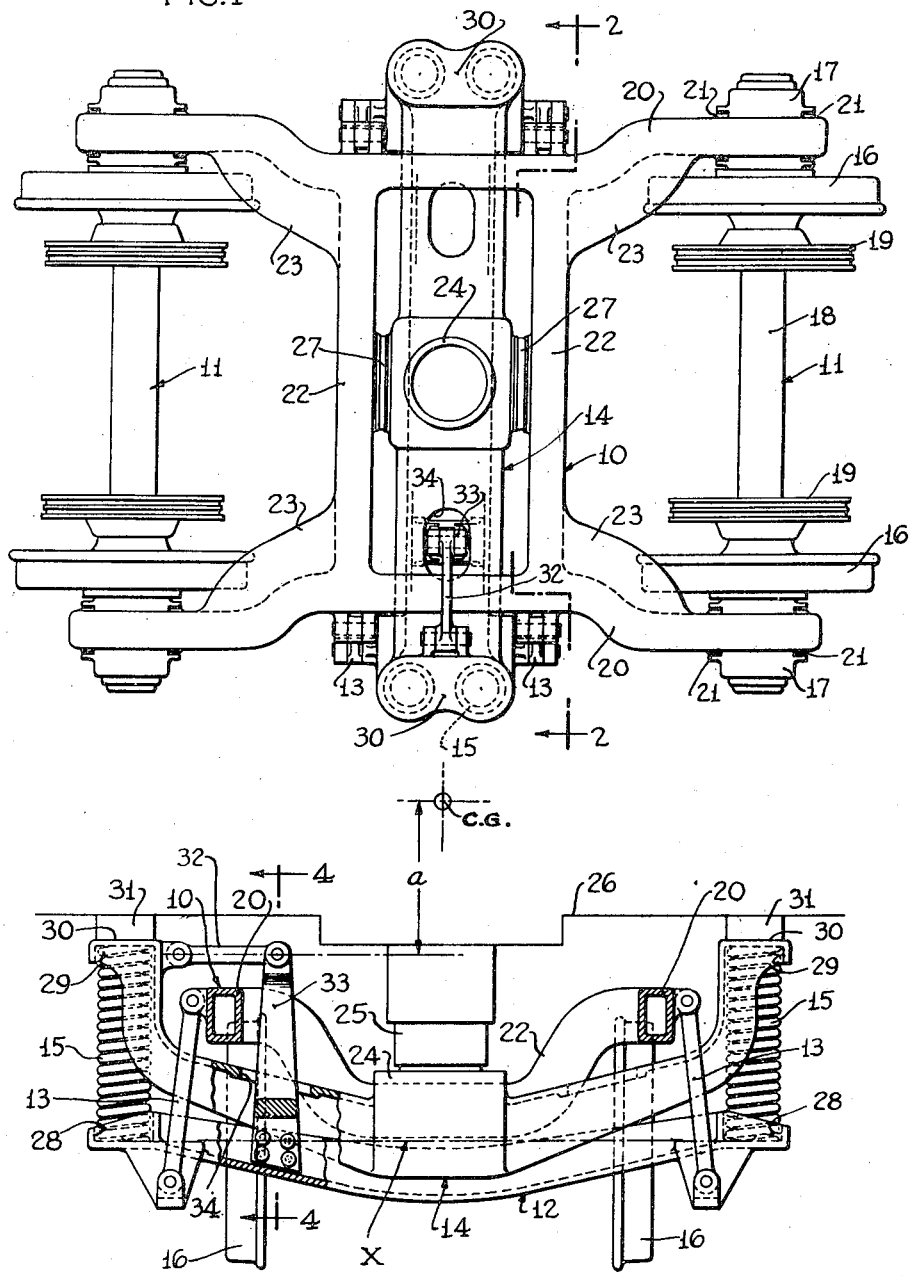
Fig. 1 is a plan view of a truck to which the invention has been shown applied.
Fig. 2 is a transverse vertical sectional view of the truck, the section being taken substantially along the line 2—2 of Fig. 1, the axis of the axle being merely indicated in this view by a dot-and-dash line X.
Figure 3:
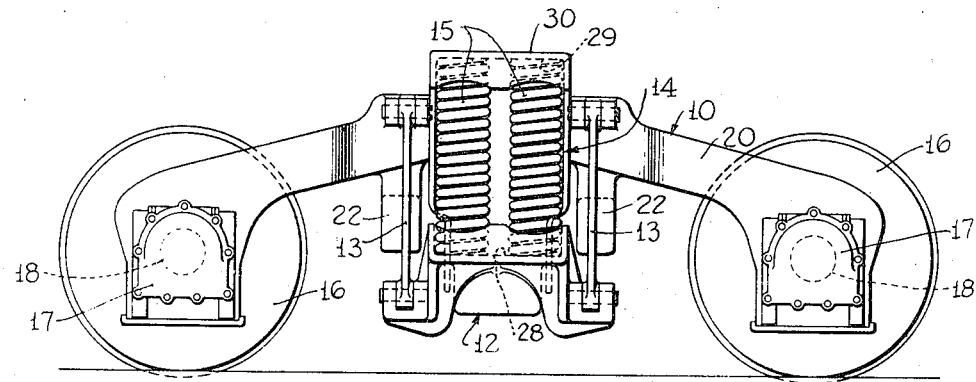
Fig. 3 is a side elevational view of the truck.

In the embodiment of the invention selected for illustration, the truck is shown as a simplified four wheel truck, comprising the frame 10 supported from two spaced wheel and axle assemblies, designated 11, a spring plank 12 supported from the frame for lateral movement through swing hangers 13, a truck bolster 14 and relatively long low-rate coil springs 15 supporting the truck bolster adjacent its ends from the spring plank.

Each wheel and axle assembly 11 may comprise the wheels 16, journal boxes 17, axle 18 journaled therein, and brake rings 19, but it will be understood that any suitable wheel structure could be employed.

The truck frame 10 is shown as comprising the longitudinally extending side members 20 having pedestal guides 21 at their ends engaging the journal boxes associated with the ends of the respective wheel and axle assemblies in any suitable known fashion.

The side members 20 are upwardly bowed and inwardly offset in their intermediate portions and are there interconnected by a pair of spaced transoms 22 which may be braced to the side members by generous gussets 23, see Fig. 1. The side members and transoms of the frame are shown as strong box section structures formed as a casting, but it will be understood that the frame may be otherwise fabricated.

The transoms 22 have their central portions offset downwardly, see Fig. 2, to approximately the level of the axles of the wheel and axle assemblies, and the central portion of the bolster 14 carying the center plate 24, upon which the corresponding center plate 25 of a car body 26 is mounted, is similarly disposed at a low level, this arrangement providing a low center of gravity, indicated c. g., of the body, and also providing for the transmission of the longitudinal forces on the bolster to the transoms substantially in the horizontal plane of the axles, where these forces can be most efficiently handled. These latter forces may be cushioned by rubber cushions 27, see Fig. 1, disposed between the central portions of the bolster and the transoms.

The spring plank 12 may be in the general form of an upwardly presenting channel and extends laterally beyond the inwardly offset intermediate portions of the longitudinal side members 20 of the frame 10. The ends are provided with spring seats, in this case, in the form of upwardly open pockets 28.

Figure 4:
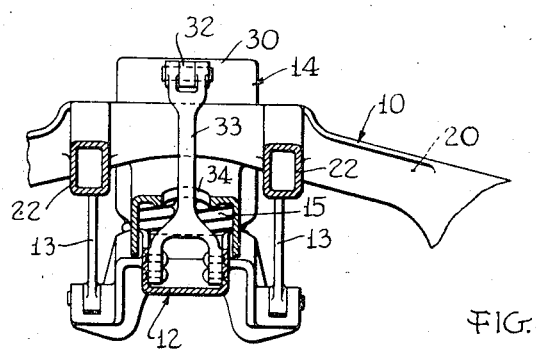
Fig. 4 is a fragmentary detail sectional view taken substantially along the line 4—4 of Fig. 2.

The bolster 14 may be of generally downwardly presenting channel section and is shown as having its central portion overlapping the sides of the spring plank, see Figs. 2 and 4. The ends of the bolster laterally beyond the longitudinal side members 20 are extended upwardly above the side frame members and formed with spring seats in the form of downwardly open pockets 29 vertically aligned with the respective pockets 28 of spring plank 12. The bolster suspending coil springs 15 have their ends seated in and laterally confined by the respective pockets 28 and 29. The high level end portions of the bolster also serve as side bearings 30 cooperating with corresponding side bearings 31 on the car body 24, see Fig. 2.

The arrangement described provides a support for the car body from the truck center plate which disposes the body center of gravity at a level but slightly above the side bearings of the truck and this tends toward lateral stability of the body, even when supported on the free acting relatively low rate bolster springs. The springs being disposed laterally beyond the side frame members further assist in maintaining lateral stability.

However, without further provision, there would still be a strong tendency for the body to roll laterally, particularly in rounding a curve at high speed, and to minimize this tendency and to prevent the lateral distortion of the springs, the invention further contemplates the restraining of this relative lateral movement by the tying together of the bolster and spring plank along a transverse line at a high level well above the truck center plate and at a relatively short distance $a$ below the center of gravity c. g. of the body. Such connection may be, as shown, by means of a generally horizontally extending transverse link 32 pivotally connected on the one hand, adjacent the top portion of one end of the bolster and on the other hand, to a vertically extending cantilever arm 33 strongly secured, see Figs. 2 and 4, to the opposite side walls of the channel section spring plank so as to form in effect an integral part thereof. The arm 33 is extended through a clearance opening 34 in the bolster.

This link arrangement permits the relative vertical movement of the bolster with respect to the spring plank with but slight relative lateral movement. Because of the high level location of the line along which the restraint offered by the link acts, viz, at approximately midway between the level of the truck center plate and the center of gravity of the body mounted thereon, it strongly resists the rolling tendency above referred to, and insures an easy riding truck construction.

While a specific embodiment of the invention has been herein described in detail, it will be understood that changes and modifications may be made by those skilled in the art without departing from the main features of the invention, and such changes and modifications are intended to be covered in the appended claims.

What is claimed is:

1. In a railway truck, a frame supported by spaced wheel and axle assemblies, said frame having longitudinal side members interconnected intermediate their ends by spaced transoms having their central portions disposed substantially at the level of the axles of said assembly, a spring plank supported from said frame by swing hangers and having spring seats disposed laterally outside the respective longitudinal side members, a bolster having its central center plate portion disposed at substantially the level of the central portions of said transoms and having its end portions extended laterally beyond said frame and upwardly to provide side bearings for a car body mounted on the truck center plate, coil springs disposed between the ends of the bolster and the respective spring seats on the spring plank, and a lateral restraint connection between said bolster and said spring plank having its line of application disposed a substantial distance above the level of the truck center plate and approaching the level of the center of gravity of a car body carried by said center plate.

2. In a railway truck, a frame supported by spaced wheel and axle assemblies, and having longitudinal side members, a spring plank supported from said side members by swing hangers, a bolster having a low center plate portion disposed substantially at the level of the axles of said assemblies, and having end portions laterally beyond the respective side members extending upwardly to form side bearings for a body supported from the truck center plate, springs supporting the ends of the bolster from the spring plank, and a high level generally horizontally arranged transversally extending link connection between said bolster and said spring plank disposed above the truck center plate.

3. In a railway truck, a frame supported by spaced wheel and axle assemblies, a spring plank supported by swing hangers from said frame, a bolster having a low center plate portion substantially at the level of the axles of said assemblies and having end portions extending upwardly to provide side bearings for a body mounted on the truck center plate, low rate springs supporting the ends of said bolster from said spring plank, and a high level transversely extending generally horizontally arranged link connection between said bolster and said spring plank and disposed vertically a substantial distance above the truck center plate level and approaching the level of the center of gravity of a car body mounted on the truck center plate.

4. In a railway truck, a wheel supported frame, a spring plank supported by swing hangers from said frame, a bolster having a low center plate portion substantially at the level of the wheel axes and having end portions extending upwardly to provide side bearings for a car body mounted on the truck center plate, coil springs supporting the bolster end portions from the spring plank, and a lateral restraint connection between said bolster and spring plank and having its line of application disposed a substantial distance above the truck center plate and approaching the horizontal plane passing through the center of gravity of a body mounted on the truck center plate.

5. In a railway truck, a wheel supported base frame, a bolster having a low center plate portion substantially at the level of the wheel axes and having end portions extending upwardly to provide side bearings for a body mounted on the truck center plate, low rate springs supporting said bolster end portions from said base frame and a high level generally horizontally arranged transversely extending link connection between said bolster and said base frame and disposed a substantial distance above said truck center plate and approaching the horizontal plane passing through the center of gravity of a body mounted on the truck center plate.

CAROLUS L. EKSERGIAN.

REFERENCES CITED

The following references are of record in the file of this patent:

UNITED STATES PATENTS

| Number | Name | Date |
|---|---|---|
| 114,587 | Morse | May 9, 1871 |
| 895,157 | Bush | Aug. 4, 1908 |
| 2,290,780 | Tack | July 21, 1942 |
| 2,322,266 | Willoughby | June 22, 1943 |